United States Patent
Ouyang et al.

(10) Patent No.: US 7,389,702 B2
(45) Date of Patent: Jun. 24, 2008

(54) MAGNETOSTRICTIVE TORQUE SENSOR

(75) Inventors: Song Ouyang, Tokyo (JP); Ryoichi Menju, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 166 days.

(21) Appl. No.: 10/564,963

(22) PCT Filed: Dec. 1, 2004

(86) PCT No.: PCT/JP2004/018238

§ 371 (c)(1),
(2), (4) Date: Jan. 18, 2006

(87) PCT Pub. No.: WO2005/054803

PCT Pub. Date: Jun. 16, 2005

(65) Prior Publication Data

US 2006/0179959 A1    Aug. 17, 2006

(30) Foreign Application Priority Data

Dec. 5, 2003  (JP) ............................. 2003-407262

(51) Int. Cl.
*G01L 3/02* (2006.01)
(52) U.S. Cl. ................................. 73/862.331
(58) Field of Classification Search ..... 73/862.331–333
See application file for complete search history.

(56) References Cited

U.S. PATENT DOCUMENTS

| 2,553,833 | A |   | 5/1951  | Rifenbergh |            |
|-----------|---|---|---------|------------|------------|
| 2,637,205 | A |   | 5/1953  | Miller     |            |
| 5,020,378 | A |   | 6/1991  | Hesthamer et al. |      |
| 5,431,063 | A |   | 7/1995  | Yasui      |            |
| 6,330,833 | B1| * | 12/2001 | Opie et al. | 73/862.333 |
| 6,823,746 | B2| * | 11/2004 | Viola et al. | 73/862.335 |
| 6,871,553 | B2| * | 3/2005  | Naidu et al. | 73/862.331 |

FOREIGN PATENT DOCUMENTS

| JP | 61-102530 A | 5/1986 |
| JP | 1-94230 A   | 4/1989 |
| JP | 3-503210 A  | 7/1991 |
| JP | 6-194239 A  | 7/1994 |
| JP | 7-18766 B2  | 3/1995 |
| JP | 2783118 B2  | 5/1998 |

\* cited by examiner

*Primary Examiner*—Max Noori
(74) *Attorney, Agent, or Firm*—Foley & Lardner LLP (57) ABSTRACT

A magnetostrictive torque sensor comprises a rotary shaft rotating around its center axis and having a magnetostrictive characteristic and a cylindrical ferrite magnetic core disposed at a predetermined distance from the outer periphery of the rotary shaft and coaxially with the rotary shaft and having on its inner peripheral surface a coil serving to detect the strain of the rotary shaft and having an insulating cover. The cylindrical ferrite magnetic core has a pair of opposed coil-forming inner peripheral surfaces defined by dividing the inner peripheral surface into two parts along a plane including the center axis. The coil has, on the respective opposed paired inner peripheral surfaces, a first coil including a going-current coil and a returning-current coil disposed in the same position at an angle of +45° to the center axis, adapted to flow a going current and a returning current in the same direction, and connected in series and a second coil including a going-current coil and a returning-current coil disposed in the same position at an angle of −45° to the center axis, crossing the first coil at right angles, adapted to flow a going current and a returning current in the same direction, and connected in series.

12 Claims, 5 Drawing Sheets

MAGNETOSTRICTIVE TORQUE SENSOR

The present application is based on Japanese patent application No. 2003-407262, the entire contents of which are incorporated herein by reference.

TECHNICAL FIELD

The present relates to a non-contact magnetostrictive torque sensor, in particular, to a non-contact magnetostrictive torque sensor, which detects a torque applied to a rotating shaft having magnetostrictive characteristics in non-contact manner from a change in inductance of a detection coil based on a change in permeability.

BACKGROUND ART

In power steering mechanism, engine control mechanism, power transmission device, etc. for vehicle, a necessity for detecting the torque applied to the steering shaft and other passive axes, etc. that are rotating shafts is high.

Generally, concerning a material having the magnetostrictive characteristics, a relative permeability varies when a force is applied thereto, and the relative permeability decreases in a compression force direction while the relative permeability increases in a tensile force direction. A magnetostrictive torque detection apparatus using this principle is disclosed, for example, in prior arts 1 and 2.

Figure 1A:
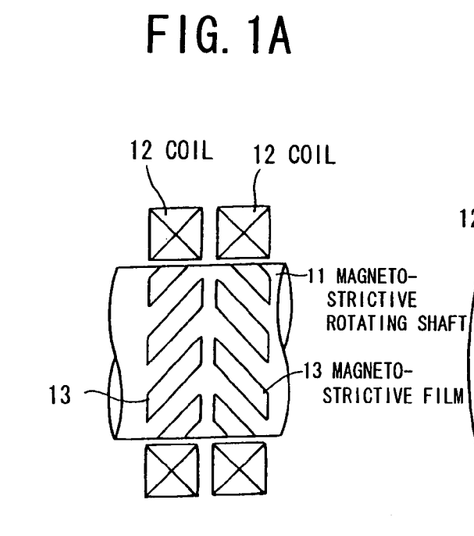
FIGS. 1A to 1C are schematic diagrams showing conventional magnetostrictive torque sensors.

The prior art 1 (Japanese Patent Laid-Open No. 1-94230) discloses a magnetostrictive torque detection apparatus shown in FIG. 1A. In this magnetostrictive torque detection apparatus, plural magnetostrictive films 13, 13 are adhered with an angle of ±45° to the rotating shaft 11 on an outer periphery of a rotating shaft 11 that is a passive axis, and ring form detection coils 12, 12 corresponding to the ±45° magnetostrictive films 13, 13 are disposed on an outer periphery thereof. When the torque is applied to the rotating shaft 11 from outside, a compression force occurs in one of the magnetostrictive films 13, 13, while a tensile force occurs in another one, thereby generating a strain, so that the permeability of the magnetostrictive films 13, 13 changes. A change in inductance of the ring form detection coils 12, 12 based on a change in permeability of these magnetostrictive films 13, 13 are detected and output.

Figure 1B:
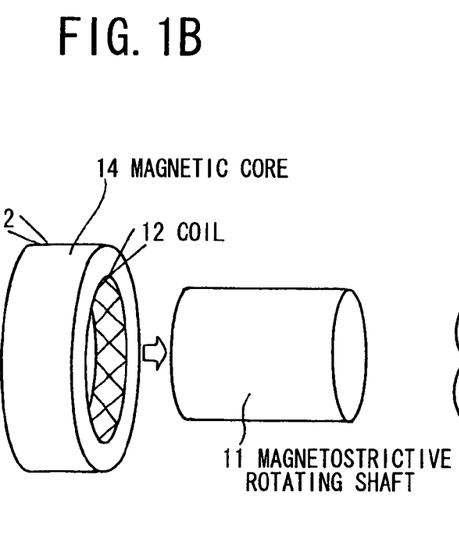

The prior art 2 (Japanese Patent Laid-Open No. 6-194239) discloses a magnetostrictive torque detection apparatus shown in FIG. 1B. In this magnetostrictive torque detection apparatus, two strips of detection coils 12, 12 inclined with an angle of ±45° to a magnetostrictive rotating shaft 11 are overlapped and adhered to an inner peripheral surface of a ring form magnetic core 14, to be disposed at a circumference of the magnetostrictive rotating shaft 11, so that the change in permeability of the magnetostrictive rotating shaft 11 is detected and output (FIGS.4 to 6 and Embodiment 4).

Figure 1C:
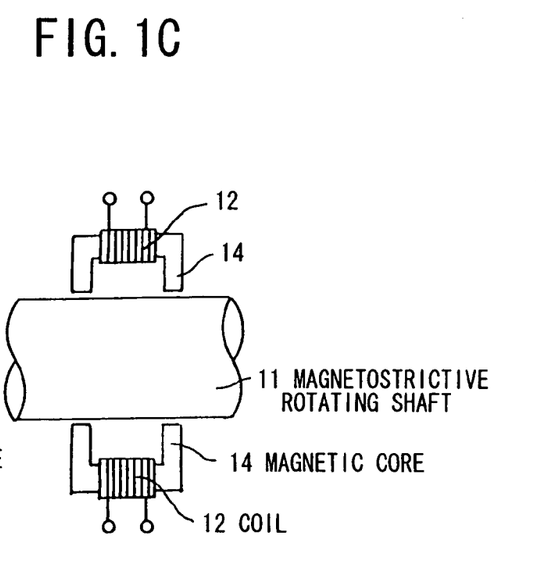

FIG. 1C shows another magnetostrictive torque detection apparatus (prior art 3). In this magnetostrictive torque detection apparatus, a change in permeability of a magnetostrictive rotating shaft 11 is detected and output, by using detection coils 12, 12 wound on U-shaped magnetic cores 14, which are disposed to be opposed in regard to the magnetostrictive rotating shaft 11.

However, the magnetostrictive torque detection apparatus according to the prior art 1 has a disadvantage in that it is necessary to process the rotating shaft 11, since the magnetostrictive films 13, 13 with an angle of ±45° are adhered to the rotating shaft 11.

In the magnetostrictive torque detection apparatus according to the prior art 2, it is not necessary to process the rotating shaft 11, however a difference of inductance between two strips of the detection coils 12, 12, which are overlapped and inclined with an angle of ±45° to the inner peripheral surface of the ring form magnetic core 14, is detected, so that it is necessary to detect increase and decrease directions of the inductance for detecting a torque direction. Further, since it is necessary for setting a zero point to detect a condition where inductances of two strips of the detection coils 12, 12 become equal to each other, it is not easy to set the zero point. Still further, since the rotating shaft 11 has a configuration penetrating through the ring form magnetic core 14, it is difficult to install the detection coil 12 thereon.

In addition, in the magnetostrictive torque detection apparatus according to the prior art 3, it is not necessary to process the rotating shaft 11, and it is easy to install on the rotating shaft 11, however, there is a following problem. Since the U-shaped magnetic cores 14 on which the detection coils 12 are wound up are not positioned rotationally symmetrical to the rotating shaft 11 such as a ring form magnetic core, and that there is a part of the rotating shaft 11 which does not face to the U-shaped magnetic cores 14, the zero point of the output signal fluctuates greatly in accordance with rotation of the rotating shaft 11.

DISCLOSURE OF THE INVENTION

Accordingly, it is an object of the invention to provide a non-contact magnetostrictive torque sensor, in which a zero point drift of an output signal in accordance with a rotation of a rotating shaft can be suppressed for improving torque detection accuracy.

It is another object of the present invention to provide a non-contact magnetostrictive torque sensor, which can be easily installed on a rotating shaft.

It is still another object of the invention to provide a non-contact magnetostrictive torque sensor, in which zero point adjustment of a detection coil circuit can be conducted accurately and easily.

According to the present invention, there is provided a magnetostrictive torque sensor, comprising:

a rotating shaft rotating around a center axis and having magnetostrictive characteristics; and a cylindrical ferrite magnetic core disposed at a predetermined distance from an outer periphery of the rotating shaft and coaxially with the rotating shaft, and provided with a coil having an insulation coating to detect a strain of the rotating shaft on its inner peripheral surface;

wherein:

the cylindrical ferrite magnetic core comprises a pair of opposed coil-forming inner peripheral surfaces formed by dividing the inner peripheral surface into two parts along a plane including the center axis; and the coil has, on each of a pair of the opposed coil-forming inner peripheral surfaces, a first coil including a forward current coil and a feedback current coil connected in series and disposed at a same position inclined with an angle of ±45° to the center axis, adapted to flow a forward current and a feedback current in a same direction and, and a second coil including a forward current coil and a feedback current coil connected in series adapted to flow a forward current and a feedback current in a same direction, and disposed at a same position inclined with an angle of −45° to the center axis and crossing with the first coil.

(i) It is preferable that the cylindrical ferrite magnetic core includes a pair of semi-cylindrical ferrite magnetic cores divided into two parts along a plane including the center axis.

(ii) It is preferable that the forward current coil and the feedback current coil of the first and second coils include forward current coils and feedback current coils, which are continuously extended by horizontal conductors and vertical conductors.

(iii) It is preferable that the horizontal conductors and the vertical conductors of the first and second coils are adapted to flow currents in different directions at a same position.

(iv) It is preferable that the first and second coils are formed in a shape of zigzag on front and back surfaces of a flexible board, and formed by folding this flexible board with an angle of 180°.

(v) It is preferable that the first and second coils are connected between a pair of the semi-cylindrical ferrite magnetic cores to compose the bridge circuit.

(vi) It is preferable that the first and second coils respectively comprises a first terminal connected to a first and second terminals of an oscillator, and a second terminal connected to a terminal for strain detection to compose the bridge circuit.

(vii) It is preferable that a differential signal from the bridge circuit is detected by the lock-in amplifier.

(viii) It is preferable that the first and second coils are accommodated in grooves formed on a pair of the opposed coil-forming inner peripheral surfaces.

(ix) It is preferable that a pair of the opposed coil-forming inner peripheral surfaces has a length L and a semi-circumference length P of the inner peripheral surface expressed as:

$$L \approx \pi D/2N (N=1, 2, 3 \ldots), \text{ and}$$

$$P \approx \pi D/2$$

wherein D is a diameter of the rotating shaft, and a distance G between adjacent grooves at both ends expressed as:

$$G \approx \pi D/4N (N=1, 2, 3 \ldots).$$

BEST MODE FOR CARRYING OUT THE INVENTION

Next, preferred embodiments according to the present invention will be explained in conjunction with the accompanying drawings.

Figure 2:
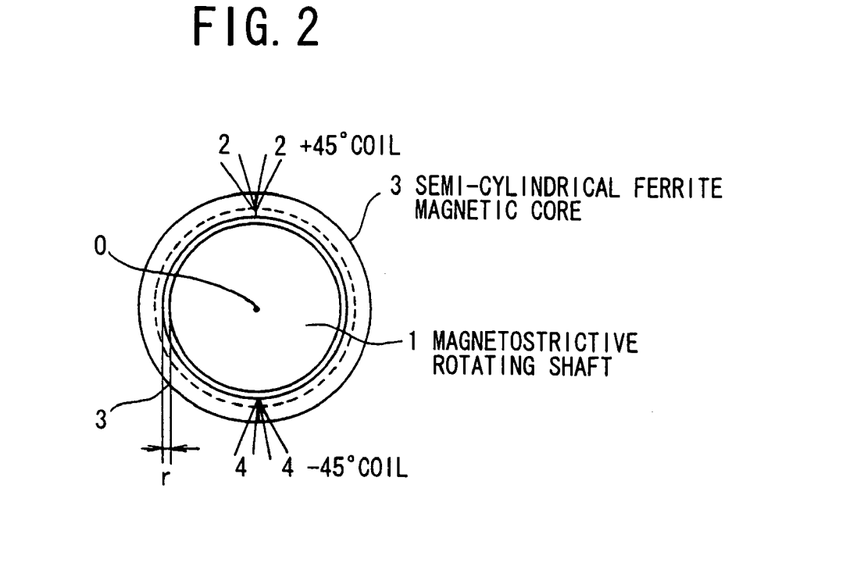
FIG. 2 is a schematic diagram showing a magnetostrictive torque sensor in a first preferred embodiment of the present invention.

FIG. 2 shows a magnetostrictive torque sensor in the first preferred embodiment according to the present invention.

This magnetostrictive torque sensor comprises a rotating shaft 1 made of metal having magnetostrictive characteristics, for example, Ni, Fe—Al alloy, Fe—Co alloy, etc., and two semi-cylindrical ferrite magnetic cores 3, 3, on which a coil 2 inclined with an angle of ±45° to an axis O of the rotating shaft 1 and a coil 4 inclined with an angle of −45° to the axis O of the rotating shaft 1 are overlapped and wound up at an inner peripheral surface. The two semi-cylindrical ferrite magnetic cores 3, 3 are disposed to be opposed concentrically and closely to the magnetostrictive rotating shaft 1 in a plane perpendicular to the axis O of the magnetostrictive rotating shaft 1.

Figure 3:
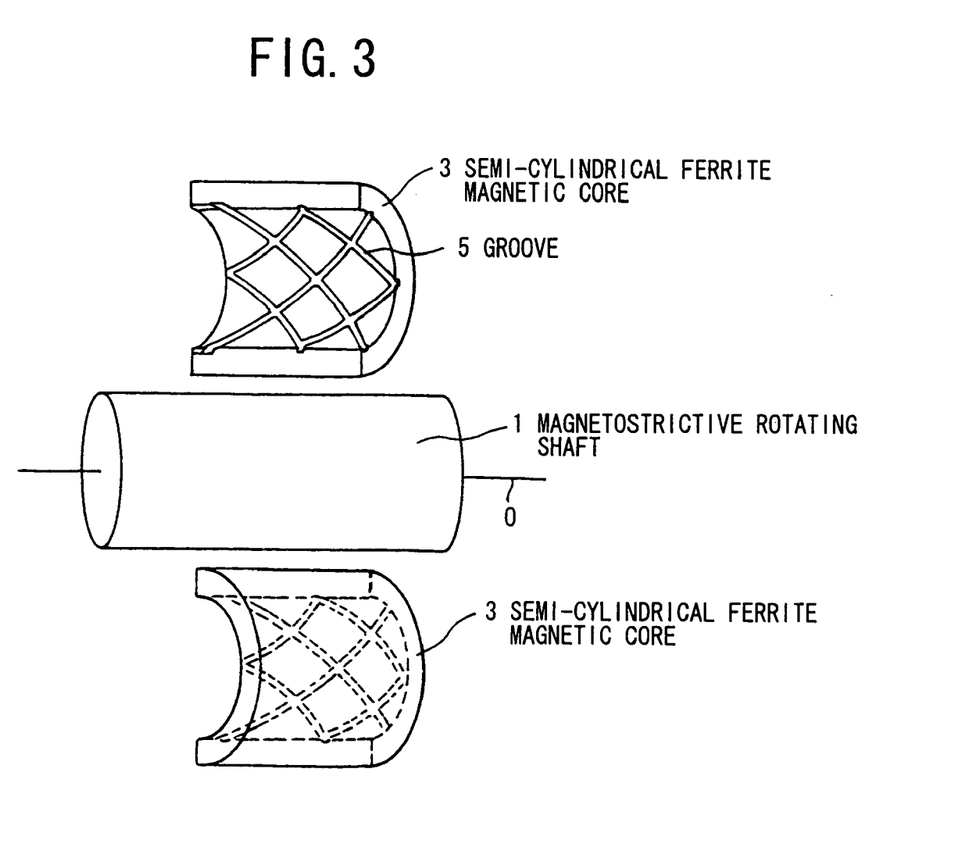
FIG. 3 is a disassembled perspective view showing the magnetostrictive torque sensor in the first preferred embodiment.

FIG. 3 is a disassembled perspective view of the magnetostrictive torque sensor shown in FIG. 2, wherein illustration of ±45° coils 2, 4 is omitted. As shown in FIG. 3, a plurality of grooves 5 inclined with an angle of ±45° to the magnetostrictive rotating shaft 1 are provided on the inner peripheral surface of the semi-cylindrical ferrite magnetic core 3 to dispose the ±45° coil 2 and −45° coil 4.

Figure 4A:
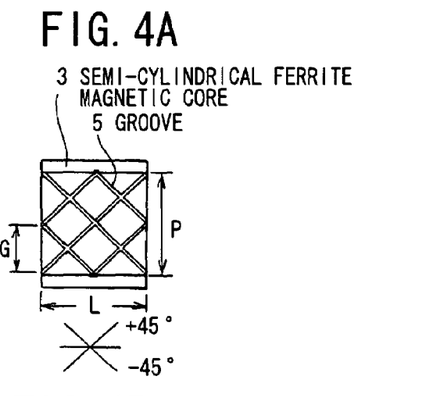
FIGS. 4A to 4C are schematic diagrams showing winding manner of coils of the magnetostrictive torque sensor in the first preferred embodiment.
Figure 4B:
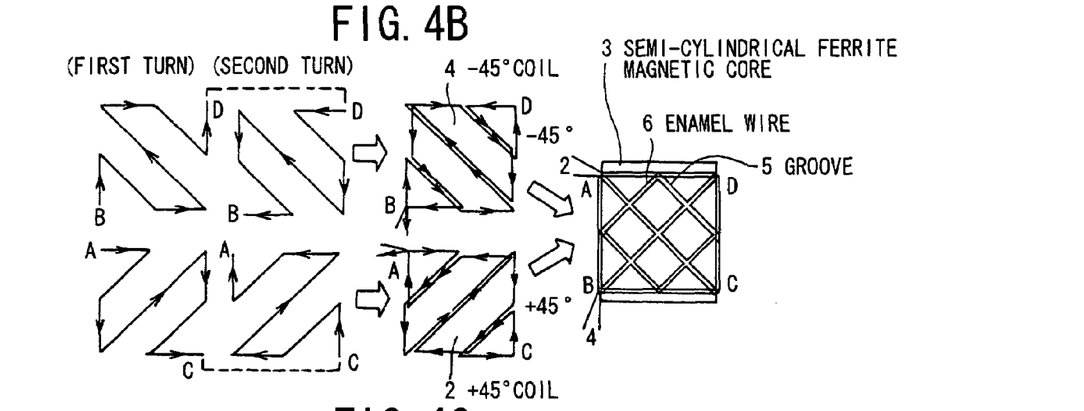
Figure 4C:
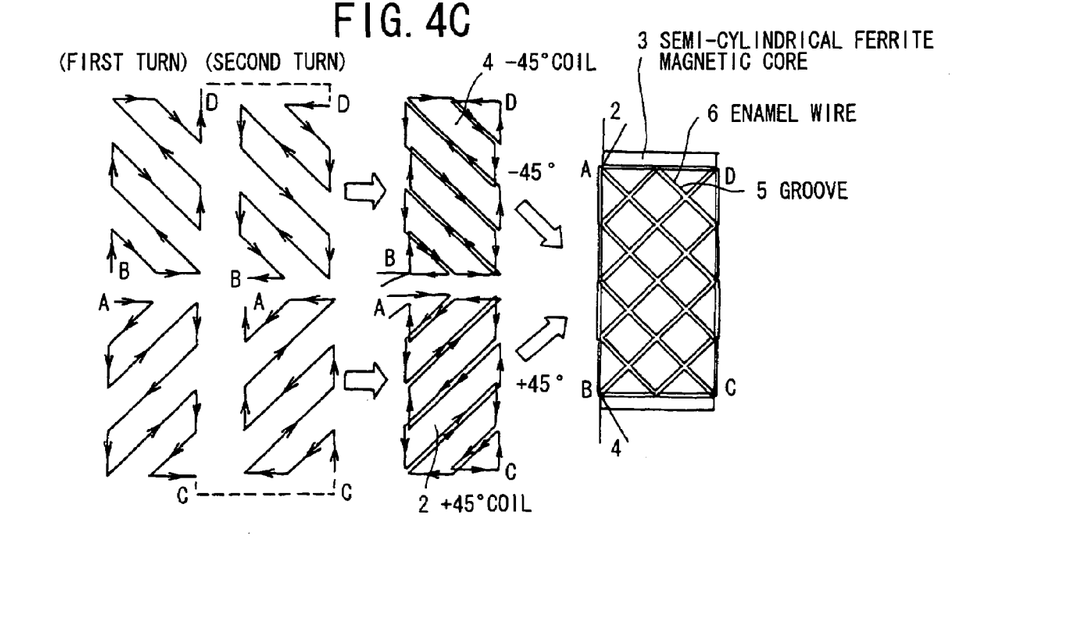

FIGS. 4A to 4C show a winding manner of coils of the magnetostrictive torque sensor shown in FIG. 2. As shown in FIG. 4A that is an interior elevation of the semi-cylindrical ferrite magnetic core, the grooves 5 provided on the inner peripheral surface of the semi-cylindrical ferrite magnetic core 3 are inclined with an angle of ±45° to the axis O of the rotating shaft 1. As explained below, a width of the grooves 5 is 1 mm, and a depth there of is 1 mm. A distance G between the grooves depends upon a length L of the magnetic core 3 and a semi-circumference length P of the inner peripheral surface of the magnetic core 3. As explained above, the two semi-cylindrical ferrite magnetic cores 3, in which the +45° 0 coil 2 and −45° coil 4 are wired in the grooves 5 on the inner peripheral surface, are disposed in parallel with keeping a predetermined distance r (FIG. 2) from a side surface of the rotating shaft 1, and disposed to be opposed concentrically and closely to the magnetostrictive rotating shaft 1 in the plane perpendicular to the axis O of the rotating shaft 1. Since the distance r between the semi-cylindrical ferrite magnetic cores 3 and the side surface of the rotating shaft 1 is very small and it can be ignored such that a detection gain improves, the length L of the semi-cylindrical ferrite magnetic core 3 is determined in a following formula:

$$L = \pi(D+2r)/2N \approx D/2N (N=1, 2, 3 \ldots) \quad (1)$$

wherein D is a diameter of the rotating shaft 1, and r is a distance between the magnetostrictive rotating shaft 1 and the semi-cylindrical ferrite magnetic core 3.

The semi-circumference length P of the inner peripheral surface of the magnetic core 3 is expressed as:

$$P = \pi(D+2r)/2 \approx D/2 \quad (2).$$

When the grooves 5 are formed on the inner peripheral surface of the semi-cylindrical ferrite magnetic core 3, the distance G between the grooves is expressed as:

$$G = L/2 = G = \pi(D+2\pi)/4N \approx D/4N (N=1, 2, 3 \ldots) \quad (3).$$

FIG. 4B shows shapes of the grooves 5 (a right-side end of FIG. 4B should be referred) and winding manner of the +45° coil 2 and −45° coil 4, when N=1, P=L≈πD/2, and G≈πD/4.

As shown in FIG. 4B, +45° coil 2 is wired on the inner peripheral surface of the semi-cylindrical ferrite magnetic core 3 with an angle of ±45° in a shape of zigzag from an apex A to an apex C (to go), and the wire is formed sequentially with an angle of +45° 0 in the shape of zigzag from the apex C to the apex A (to return).

In a similar manner, the −45° coil 4 is wired on the inner peripheral surface of the same semi-cylindrical ferrite magnetic core 3 with an angle of −45° in the shape of zigzag from an apex B to an apex D (to go), and the wire is formed sequentially with an angle of −45° in the shape of zigzag from the apex D to the apex B (to return). The two coils 2, 4 are overlapped and formed on the inner peripheral surface of one semi-cylindrical ferrite magnetic core 3. An enamel wire 6 having a diameter of 0.2 mm is used for the +45° coil 2 and −45° coil 4, and a winding number of the +45° 0 coil 2 and −45° coil 4 is 2 turns, respectively.

Similarly to FIG. 4B, FIG. 4C shows shape of the grooves 5 (a right-side end of FIG. 4C should be referred) and winding manner of the +45° coil 2 and −45° coil 4, when N=2, P≈πD/2, L≈D/4, and G≈πD/8. According to the formula (1) when N becomes great, the length L of the semi-cylindrical ferrite magnetic core 3 becomes small. Namely, a volume of the torque sensor becomes small. However, when N becomes great, the distance G between the grooves becomes short and an affect between the conductors inclined to the rotating shaft 1 in a same direction increases, so that an adverse effect occurs in output signals.

In addition, as a method for forming wirings, a method in which one coil (for example, the +45° coil 2) is wound up for only a predetermined number of times and another coil (for example, the −45° coil 4) is wound up for only the same number of times then they are overlapped, is explained above, however both the coils may be wound up alternately.

Figure 5A:
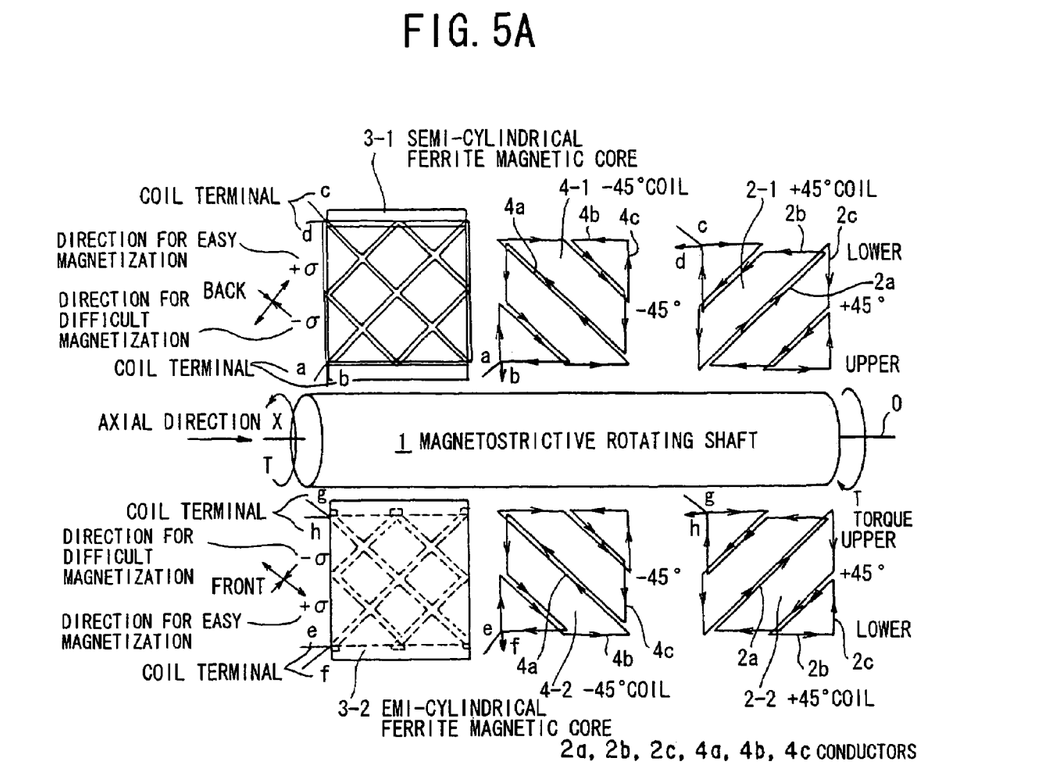
FIG. 5A is a schematic diagram showing operating principle of the magnetostrictive torque sensor in the first preferred embodiment.

Next, an operation principle of the magnetostrictive torque sensor in the first embodiment will be explained. As shown in FIG. 5A, a torque T is applied to the rotating shaft 1, such that a force functions in a counter-clockwise direction at a left side in the drawing and in a clockwise direction at a right side in the drawing, viewed from an axial direction X. Hereinafter, the torque T in this direction is determined as a positive direction. At this time, viewed from a front side of the rotating shaft 1, a compressive force is to be applied in +45° direction for the rotating shaft 1, and a tensile force is to be applied in −45° direction therefor. Viewed from a back side of the rotating shaft 1, a compressive force is to be applied in −45° direction for the rotating shaft 1, and a tensile force is to be applied in +45° direction therefor. This principal stress σ is proportional to the torque T, and derived from a following formula, when a diameter of the rotating shaft is determined as D:

$$\sigma = 16T/(\pi D^3) \qquad (4).$$

At this time, if the rotating shaft 1 has the magnetostrictive effect, an axial magnetic anisotropy Ku will be induced by the principal stress σ.

$$Ku = 2 \cdot (3/2) \lambda s \sigma = 48 \lambda s T/(\pi D^3) \qquad (5)$$

wherein λs is a saturation magnetostrictive constant of the rotating shaft 1.

By the effect of this axial magnetic anisotropy Ku, a +σ direction becomes a direction for easy magnetization, and a −σ direction becomes a direction for difficult magnetization, and in connection with a magnetostatic energy, a relative permeability in the direction for easy magnetization, i.e. the +σ direction increases, while a relative permeability in the direction for difficult magnetization, i.e. the −σ direction decreases on the contrary. Therefore, when a current is flown into the coil inclined to the direction for difficult magnetization, i.e. the −σ direction (compressive force direction), a magnetic flux formed by the coil inclined to the direction for easy magnetization, i.e. the +σ direction (tensile force direction) so that the relative permeability in the tensile force direction becomes high, as a result, an induction current is flown to a direction to decrease the magnetic flux in the tensile force direction and an induction voltage is induced by the induction current, so that an inductance of this coil becomes large.

On the other hand, when a current is flown into the coil inclined to the direction for easy magnetization, i.e. the +σ direction (tensile force direction), the magnetic flux formed by the coil inclined to the direction for difficult magnetization, i.e. the −σ direction (compressive force direction) so that the relative permeability in the compressive force direction becomes low, as a result, an induction current is flown to a direction to increase the magnetic flux in the compressive force direction and an induction voltage is induced by the induction current, so that an inductance of this coil becomes small.

Figure 5B:
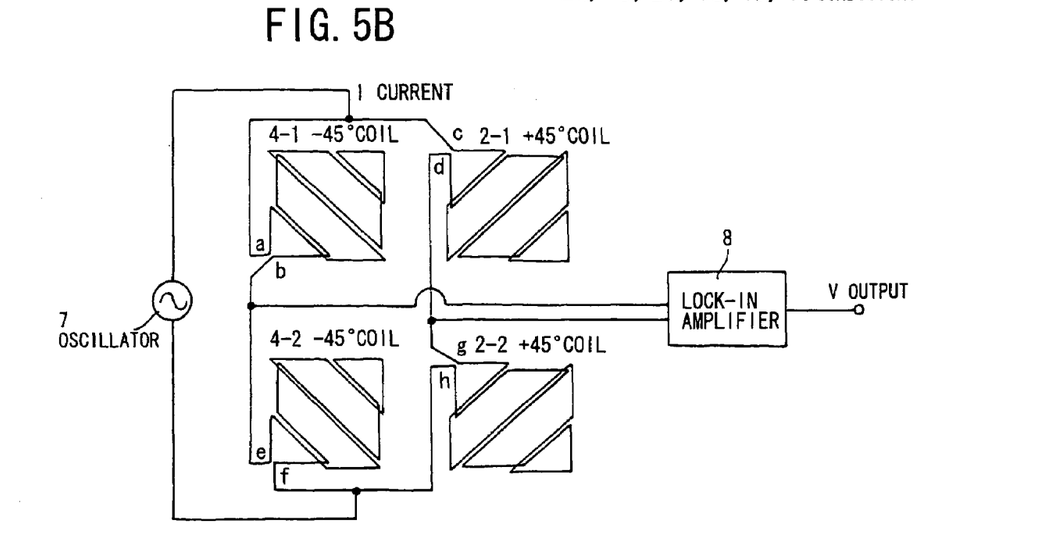
FIG. 5B is a diagram showing a detecting circuit for detecting a torque applied to a magnetostrictive rotating shaft.

FIG. 5B shows a detecting circuit for detecting a torque applied to the magnetostrictive rotating shaft 1 due to electric characteristics of the coil. A bridge circuit as shown in FIG. 5B is composed of four detection coils 2-1, 2-2, 4-1, and 4-2 shown in FIG. 5A. A terminal b of the coil 4-1 and a terminal e of the coil 4-2 are connected. Similarly, a terminal d of the coil 2-1 and a terminal g of the coil 2-2 are connected. Then, an oscillator 7 for driving a circuit is connected to both terminals of the detection coils 2-1 and 2-2 and the detection coils 4-1 and 4-2 connected in series, and a lock-in amplifier 8 for detecting, amplifying and outputting a differential signal generated from the bridge circuit when torque is applied is connected between the detection coils 2-1 and 2-2, and the detection coils 4-1 and 4-2.

Next, an operation of the detecting circuit shown in FIG. 5B will be explained. A high frequency current I generated from the oscillator 7 is flown into the terminal a of the coil 4-1 and the terminal c of the coil 2-1, and flown out from the terminal f of the coil 4-2 and the terminal h of the coil 2-2. When the torque is not applied, the zero point adjustment is conducted such that the detecting circuit is in an equilibrium state. As shown in FIG. 5A, when a positive torque is applied, an inductance L between the coil 4-1 and the coil 2-2 increases by ΔL, while the inductance L between the coil 4-2 and the coil 2-1 decreases by ΔL, and an output V from the lock-in amplifier 8 increases in a positive direction. On the other hand, when a negative torque is applied, an inductance L between the coil 4-1 and the coil 2-2 decreases by ΔL, while the inductance L between the coil 4-2 and the coil 2-1 increases by ΔL, and an output V from the lock-in amplifier 8 decreases in a negative direction. Accordingly, direction and magnitude of the torque T are detected.

According to the detecting circuit shown in FIG. 5B, stable and precise zero point adjustment can be conducted easily by keeping a balance of the bridge circuit for the four detection coils 2-1, 2-2, 4-1, and 4-2, and further, since noise is removed by the lock-in amplifier 8.

As shown in FIG. 5A, a connecting conductor (i.e. conductor part which is parallel to the rotating shaft 1) 2b for the +45° coil 2-2 disposed on the inner peripheral surface of the semi-cylindrical ferrite magnetic core 3-2 located at the front side of the rotating shaft 1 and a connecting conductor (i.e. conductor part which is parallel to the rotating shaft 1) 2b for the +45° coil 2-1 disposed on the inner peripheral surface of the semi-cylindrical ferrite magnetic core 3-1 located at the back side of the rotating shaft 1 are arranged to be overlapped, and currents are flown therethrough in directions opposed to each other so that the currents are offset as a whole, thereby generating substantially no magnetic field.

Similarly, a connecting conductor (i.e. conductor part which is parallel to the rotating shaft 1) 4b for the −45° coil 4-2 disposed on the inner peripheral surface of the semi-cylindrical ferrite magnetic core 3-2 located at the front side of the rotating shaft 1 and a connecting conductor (i.e. conductor part which is parallel to the rotating shaft 1) 4b for the −45° coil 4-1 disposed on the inner peripheral surface of the semi-cylindrical ferrite magnetic core 3-1 located at the back side of the rotating shaft 1 are arranged to be overlapped, and currents are flown therethrough in directions opposed to each other so that the currents are offset as a whole, thereby generating substantially no magnetic field.

On the other hand, a connecting conductor (i.e. conductor part which is vertical to the rotating shaft 1) 2c for the +45° coils 2-1, 2-2 disposed on the inner peripheral surface of the semi-cylindrical ferrite magnetic cores 3-1, 3-2 and a connecting conductor (i.e. conductor part which is vertical to the rotating shaft 1) 4c for the −45° coils 4-1, 4-2 disposed on the inner peripheral surface of the identical semi-cylindrical ferrite magnetic cores 3-1, 3-2 are arranged to be overlapped, and currents are flown therethrough in directions opposed to each other so that the currents are offset as a whole, thereby generating substantially no magnetic field. Therefore, generation of unnecessary inductance is suppressed, so that a detection error can be prevented.

In addition, according to a configuration of the magnetostrictive torque sensor as described above, by disposing two semi-cylindrical ferrite magnetic cores 3 having the +45° coil 2 and −45° coil 4 at their inner peripheral surfaces to face to each other around a whole periphery of the magnetostrictive rotating shaft 1, even if a local change of magnetic characteristics of the magnetostrictive rotating shaft 1 occurs, it can be stabilized without depending on a rotating angle of the magnetostrictive rotating shaft 1 and without influencing the output characteristics of the output sensor. Namely, the zero point drift of the output signal in accordance with rotation of the magnetostrictive rotating shaft 1 can be made small.

In addition, the magnetostrictive torque sensor can be installed on the rotating shaft 1 easily, since the magnetostrictive torque sensor is composed of the two semi-cylindrical ferrite magnetic cores 3.

Figures 6A, 6B:
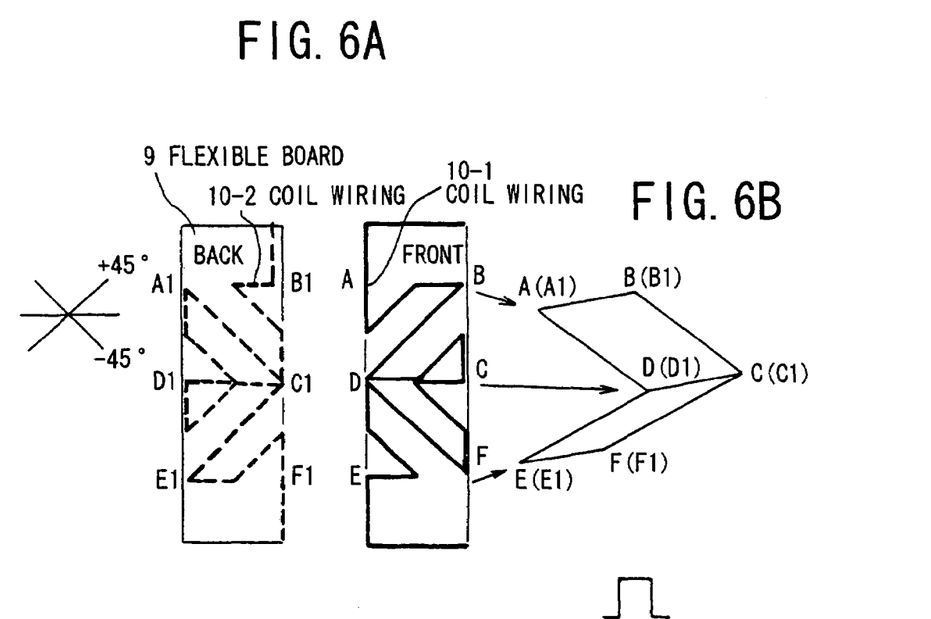
FIGS. 6A to 6D are schematic diagrams showing a structure of a magnetostrictive torque sensor in a second preferred embodiment of the present invention and a method for manufacturing the same.
Figure 6C:
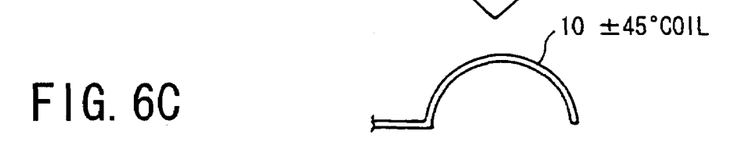
Figure 6D:
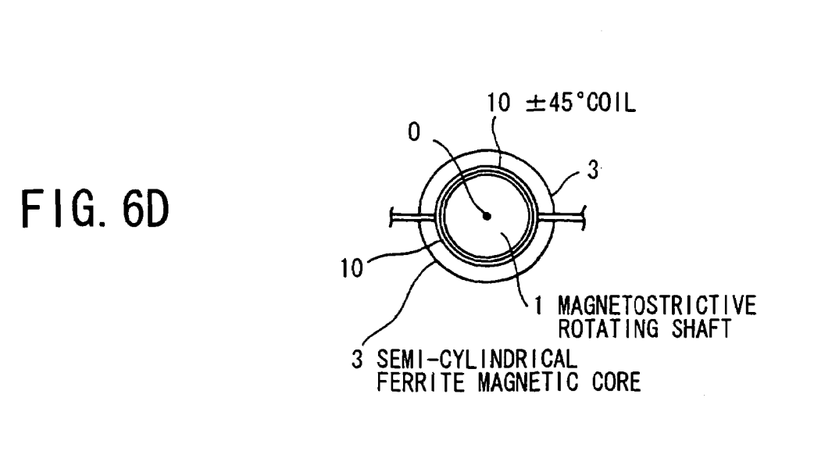

FIG. 6 shows a magnetostrictive torque sensor in the second preferred embodiment according to the present invention. So as to form one detection coil 10, as shown in FIG. 6A, a coil wiring 10-1 is wired with an angle of +45° in a shape of zigzag from an apex A to an apex C on one side of an elongated strip shaped flexible board 9 (an insulation process is conducted for a surface of the wiring), and a wiring with an angle of −45° is sequentially formed in shape of the zigzag from an apex C to an apex E. Pads for pull-out are formed at both terminals A and E of this wiring.

Similarly, a coil wiring 10-2 is wired with an angle of −45° in a shape of zigzag from an apex B1 (provided on an opposite side of a point B) to an apex D1 (provided on an opposite side of a point D) on an opposite side of the flexible board 9 (an insulation process is conducted for a surface of the wiring), and a wiring with an angle of +45° is sequentially formed in shape of the zigzag from the apex D1 to an apex F1 (provided on an opposite side of a point F). Pads for pull-out are formed at both terminals B1 and F1 of this wiring.

This flexible board 9 is folded along a line segment C(C1)-D(D1) to overlap A and E, and B and F, respectively, and to overlap A1 and E1, and B1 and F1 of the opposite side, respectively, as shown in FIG. 6B, thereby forming a strip of −45° coil 10 as shown in FIG. 6C. This ±45° coil 10 is adhered to the inner peripheral surface of the semi-cylindrical ferrite magnetic core 3, and two semi-cylindrical ferrite magnetic cores 3 are disposed to be opposed closely on a whole periphery of the magnetostrictive rotating shaft 1, similarly to the first preferred embodiment, thereby constituting the magnetostrictive torque sensor.

In addition, since the operation principle of the magnetostrictive torque sensor in the second preferred embodiment is similar to that of the first preferred embodiment, an explanation thereof is omitted.

According to a configuration of the second preferred embodiment, in the conductor parts other than the conductor part inclined with an angle of ±45° of the coil 10, i.e. the conductor part which is parallel to the rotating shaft 1 and the conductor part which is vertical to the rotating shaft 1, currents are flown through the respective conductor parts in directions opposed to each other so that the currents are offset as a whole, thereby generating substantially no magnetic field. Therefore, generation of unnecessary inductance is suppressed, so that a detection error can be prevented.

In addition, as described above, by disposing the two semi-cylindrical ferrite magnetic cores 3 having the ±45° coil 2 and −45° coil 4 on their inner peripheral surfaces to be opposed to each other on a whole periphery of the magnetostrictive rotating shaft 1, even if a local change of magnetic characteristics of the magnetostrictive rotating shaft 1 occurs, it can be stabilized without depending on a rotating angle of the magnetostrictive rotating shaft 1 and without influencing the output characteristics of the output sensor. Namely, the zero point drift of the output signal in accordance with rotation of the magnetostrictive rotating shaft 1 can be made small.

Further, since the number of detection coils is four, by composing the bridge circuit for the detection coils and keeping a balance of the bridge circuit, stable and precise zero point adjustment can be conducted easily.

Still further, according to the configuration of the second preferred embodiment, the detection coil 10 is formed to have two layers, however, when it is applied actually, the detection coil 10 may be formed to be multilayered, so that improvement of a detection gain can be obtained.

Furthermore, according to the configuration of the second preferred embodiment, since it is not necessary to process the grooves on the inner peripheral surface of the semi-cylindrical ferrite magnetic core 3, the magnetostrictive torque sensor can be construed less expensive.

In addition, since the magnetostrictive torque sensor is composed of the two semi-cylindrical ferrite magnetic cores 3, it can be installed on the rotating shaft 1 easily.

The present invention is described in connection with specific embodiments for complete and clear disclosure, but attached claims are not limited to these embodiments, and it should be interpreted as embodying all changes and alternative structures appropriately included in scope of basic teaching described in the present specification that is obvious for those skilled in the art.

INDUSTRIAL APPLICABILITY

In a non-contact magnetostrictive torque sensor according to the present invention, since ±45° coils function similarly to a ring shape axial rotation symmetrical detection coil in regard to a magnetostrictive rotating shaft when current is flown, an output signal does not depend upon a rotation angle of the magnetostrictive rotating shaft. Namely, a zero point drift of the output signal in accordance with the rotation of the magnetostrictive rotating shaft can be made small.

In addition, according to the present invention, since the magnetostrictive rotating shaft is divided into two semi-cylindrical ferrite magnetic cores, it can be installed on the torque sensor easily.

Furthermore, according to the present invention, as for a horizontal conductor and a vertical conductor included in ±45° coils, since electric currents are flown in directions opposite to each other at respective overlapped parts, the currents are offset as a whole thereby generating substantially no magnetic field. Therefore, generation of unnecessary inductance can is suppressed so that a detection error can be prevented.

Still further, according to the present invention, since ±45° coils are disposed in each of a pair of the opposed coil-forming inner peripheral surfaces, the connection of a bridge circuit is easy and the bridge circuit can be assembled without requiring an external circuit. By keeping a balance of the bridge circuit, stable and precise zero point adjustment can be conducted easily.

Furthermore, according to the present invention, since noise is removed with a lock-in amplifier, the detection error can be prevented.

The invention claimed is:

1. A magnetostrictive torque sensor, comprising:
a rotating shaft rotating around a center axis and having magnetostrictive characteristics; and
a cylindrical ferrite magnetic core disposed at a predetermined distance from an outer periphery of the rotating shaft and coaxially with the rotating shaft, and provided with a coil having an insulation coating to detect a strain of the rotating shaft, wherein the coil is provided on an inner peripheral surface of the core;
wherein:
the cylindrical ferrite magnetic core comprises a pair of opposed coil-forming inner peripheral surfaces formed by dividing the inner peripheral surface of the core into two parts along a plane that includes the center axis; and
the coil has, on each of the pair of the opposed coil-forming inner peripheral surfaces, a first coil including a forward current coil and a feedback current coil connected in series and disposed at a same position inclined with an angle of +45° to the center axis, adapted to flow a forward current and a feedback current in a same direction, and a second coil including a forward current coil and a feedback current coil connected in series adapted to flow a forward current and a feedback current in a same direction, and disposed at a same position inclined with an angle of −45° to the center axis and crossing with the first coil.

2. The magnetostrictive torque sensor, according to claim 1, wherein:
the cylindrical ferrite magnetic core includes a pair of semi-cylindrical ferrite magnetic cores divided into two parts along a plane including the center axis.

3. The magnetostrictive torque sensor, according to claim 1, wherein:
the forward current coil and the feedback current coil of the first and second coils include forward current coils and feedback current coils, which are continuously extended by horizontal conductors and vertical conductors.

4. The magnetostrictive torque sensor, according to claim 3, wherein:
the horizontal conductors and the vertical conductors of the first and second coils are adapted to flow currents in different directions at a same position.

5. The magnetostrictive torque sensor, according to claim 1, wherein:
the first and second coils are formed in a shape of zigzag on front and back surfaces of a flexible board and are formed by folding this flexible board with an angle of 180°.

6. The magnetostrictive torque sensor, according to claim 2, wherein:
the first and second coils are connected between a pair of the semi-cylindrical ferrite magnetic cores to compose a bridge circuit.

7. The magnetostrictive torque sensor, according to claim 1, wherein:
the first and second coils respectively comprise a first terminal connected to a first and second terminals of an oscillator, and a second terminal connected to a terminal for strain detection to compose a bridge circuit.

8. The magnetostrictive torque sensor, according to claim 7, wherein:
a differential signal from the bridge circuit is detected by a lock-in amplifier.

9. The magnetostrictive torque sensor, according to claim 1, wherein:
the first and second coils are accommodated in grooves formed on a pair of the opposed coil-forming inner peripheral surfaces.

10. The magnetostrictive torque sensor, according to claim 9, wherein:
the pair of the opposed coil-forming inner peripheral surfaces has a length L and a semi-circumference length P of the inner peripheral surface expressed as:

$$L \approx \pi D/2N (N=1, 2, 3 \ldots), \text{ and}$$

$$P \approx \pi D/2$$

wherein D is a diameter of the rotating shaft, and
a distance G between adjacent grooves at both ends expressed as:

$$G \approx \pi D/4N (N=1, 2, 3 \ldots).$$

11. The magnetostrictive torque sensor, according to claim 1, wherein the core is hollow.

12. The magnetostrictive torque sensor, according to claim 1, wherein the inner peripheral surface of the core is an interior surface of the core.

* * * * *